US010244005B2

(12) United States Patent
Mufti et al.

(10) Patent No.: US 10,244,005 B2
(45) Date of Patent: Mar. 26, 2019

(54) ENHANCED IMS SERVICES RESTRICTION AND SELECTION CONTROL FOR MOBILE DEVICES ROAMING IN FOREIGN NETWORKS

(71) Applicant: T-Mobile USA, Inc., Bellevue, WA (US)

(72) Inventors: Shujaur Mufti, Snoqualmie, WA (US); Rob Piscopo, Bellevue, WA (US); Shelby Seward, Bellevue, WA (US); Zeeshan Jahangir, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/826,566

(22) Filed: Nov. 29, 2017

(65) Prior Publication Data

US 2018/0084014 A1    Mar. 22, 2018

Related U.S. Application Data

(63) Continuation of application No. 14/335,836, filed on Jul. 18, 2014, now Pat. No. 9,871,828.

(51) Int. Cl.
*H04L 29/06* (2006.01)
*H04W 8/12* (2009.01)
*H04W 60/00* (2009.01)

(52) U.S. Cl.
CPC ...... *H04L 65/1016* (2013.01); *H04L 65/1073* (2013.01); *H04W 8/12* (2013.01); *H04W 60/005* (2013.01)

(58) Field of Classification Search
CPC .. H04L 65/1016; H04L 65/1073; H04W 8/12; H04W 60/005
See application file for complete search history.

(56) References Cited

U.S. PATENT DOCUMENTS

| 7,983,228 B1 | 7/2011 | Choksi |
| 8,054,780 B1 | 11/2011 | Manroa et al. |
| 9,871,828 B2 | 1/2018 | Mufti et al. |

(Continued)

FOREIGN PATENT DOCUMENTS

| EP | 1715625 A1 | 10/2006 |
| WO | 2016011302 | 1/2016 |

OTHER PUBLICATIONS

European Patent Office, Extended European Search Report, EP Patent Application 15822049.1, dated Jun. 25, 2018, 13 pages.

(Continued)

*Primary Examiner* — Jenee Holland
(74) *Attorney, Agent, or Firm* — Perkins Coie LLP

(57) ABSTRACT

A system and method that allows a mobile device to register for IMS services while the mobile device is roaming in a visited telecommunications network is disclosed. The system receives a request for multiple IMS services from a mobile device while the mobile device is roaming in a foreign network. The system uses an identifier of the foreign network and an associated RAT type to query a policy table containing a list of whitelisted IMS services for the foreign network and associated RAT type. The system processes the requested IMS registrations for services that are whitelisted and does not process requested IMS registrations for services that are not on the whitelist.

20 Claims, 10 Drawing Sheets

(56) References Cited

U.S. PATENT DOCUMENTS

| | | | | |
|---|---|---|---|---|
| 2002/0177466 A1* | 11/2002 | Laurila | H04W 36/0083 | 455/552.1 |
| 2003/0045290 A1* | 3/2003 | Tuohimetsa | H04W 48/16 | 455/435.1 |
| 2004/0022208 A1* | 2/2004 | Dahod | H04W 4/10 | 370/328 |
| 2005/0120198 A1* | 6/2005 | Bajko | H04L 29/12047 | 713/150 |
| 2006/0203773 A1* | 9/2006 | Georges | H04L 45/50 | 370/329 |
| 2006/0223501 A1* | 10/2006 | Van Moffaert | H04L 63/08 | 455/411 |
| 2006/0271693 A1* | 11/2006 | Thiebaut | H04W 8/12 | 709/229 |
| 2007/0025298 A1* | 2/2007 | Jung | H04W 8/12 | 370/331 |
| 2007/0124438 A1* | 5/2007 | Park | H04L 29/06027 | 709/223 |
| 2007/0189215 A1* | 8/2007 | Wu | H04W 8/12 | 370/331 |
| 2007/0238468 A1* | 10/2007 | Buckley | H04Q 3/0045 | 455/445 |
| 2007/0243876 A1* | 10/2007 | Duan | H04W 4/14 | 455/445 |
| 2008/0014956 A1* | 1/2008 | Balasubramanian | H04L 41/0806 | 455/452.1 |
| 2008/0063176 A1* | 3/2008 | Strieter | H04M 3/42374 | 379/215.01 |
| 2008/0160995 A1* | 7/2008 | Thiebaut | H04L 29/06027 | 455/433 |
| 2008/0176552 A1* | 7/2008 | Hamano | H04W 48/18 | 455/422.1 |
| 2008/0181198 A1* | 7/2008 | Yasrebi | H04L 12/66 | 370/352 |
| 2008/0207181 A1* | 8/2008 | Jiang | H04W 4/14 | 455/414.1 |
| 2008/0274735 A1* | 11/2008 | Choksi | H04L 65/1073 | 455/432.2 |
| 2009/0049526 A1* | 2/2009 | Zhang | H04L 63/101 | 726/4 |
| 2009/0083426 A1* | 3/2009 | Cagenius | H04L 29/125 | 709/227 |
| 2009/0088129 A1* | 4/2009 | Cai | H04L 12/1403 | 455/406 |
| 2009/0100147 A1* | 4/2009 | Igarashi | H04N 7/17309 | 709/218 |
| 2009/0117927 A1* | 5/2009 | Li | H04L 65/1016 | 455/466 |
| 2009/0172782 A1* | 7/2009 | Taglienti | G06Q 30/06 | 726/4 |
| 2009/0213001 A1* | 8/2009 | Appelman | H04L 12/581 | 342/357.59 |
| 2009/0285166 A1* | 11/2009 | Huber | G06Q 20/1235 | 370/329 |
| 2009/0304009 A1* | 12/2009 | Kolhi | H04L 63/08 | 370/400 |
| 2010/0046528 A1* | 2/2010 | Foti | H04L 12/185 | 370/401 |
| 2010/0112980 A1* | 5/2010 | Horn | H04W 48/20 | 455/411 |
| 2010/0128685 A1* | 5/2010 | Jiang | H04W 8/12 | 370/329 |
| 2010/0130165 A1* | 5/2010 | Snyder | G06F 21/88 | 455/410 |
| 2010/0130197 A1* | 5/2010 | Wu | H04W 8/18 | 455/433 |
| 2010/0198741 A1* | 8/2010 | Horowitz | G06Q 10/00 | 705/319 |
| 2010/0223339 A1* | 9/2010 | Cheng | H04L 29/12216 | 709/206 |
| 2010/0312897 A1* | 12/2010 | Allen | H04L 12/1822 | 709/227 |
| 2011/0077058 A1* | 3/2011 | Cai | H04L 12/14 | 455/573 |
| 2011/0103372 A1* | 5/2011 | Shatsky | H04L 65/1016 | 370/352 |
| 2011/0116382 A1* | 5/2011 | McCann | H04L 63/0263 | 370/241 |
| 2011/0158090 A1* | 6/2011 | Riley | H04L 12/14 | 370/230 |
| 2011/0165857 A1* | 7/2011 | Pihlajamaki | H04L 67/24 | 455/405 |
| 2011/0231544 A1* | 9/2011 | Javenpaa | H04L 67/24 | 709/224 |
| 2011/0246624 A1* | 10/2011 | Kato | H04L 65/1016 | 709/219 |
| 2011/0289217 A1* | 11/2011 | Prasad | H04L 65/1016 | 709/225 |
| 2012/0047262 A1* | 2/2012 | Laarakkers | H04L 63/145 | 709/225 |
| 2012/0069840 A1* | 3/2012 | Zhu | H04M 7/123 | 370/353 |
| 2012/0096115 A1* | 4/2012 | McColgan | H04W 4/001 | 709/217 |
| 2012/0134323 A1* | 5/2012 | Perkuhn | H04W 8/06 | 370/328 |
| 2012/0172037 A1 | 7/2012 | Zhu et al. | | |
| 2012/0191847 A1* | 7/2012 | Nas | H04L 63/0227 | 709/224 |
| 2012/0202550 A1* | 8/2012 | Marsico | H04W 8/08 | 455/515 |
| 2012/0220330 A1* | 8/2012 | Goldner | H04L 12/1407 | 455/517 |
| 2012/0236760 A1* | 9/2012 | Ionescu | H04W 4/22 | 370/259 |
| 2012/0246325 A1* | 9/2012 | Pancorbo Marcos | H04L 63/102 | 709/227 |
| 2013/0083726 A1* | 4/2013 | Jain | H04W 28/0215 | 370/328 |
| 2013/0231107 A1* | 9/2013 | Mannepally | H04W 8/06 | 455/432.3 |
| 2013/0288670 A1* | 10/2013 | Moses | H04W 8/12 | 455/432.1 |
| 2014/0120909 A1* | 5/2014 | Malassis | H04W 48/16 | 455/434 |
| 2014/0141763 A1* | 5/2014 | Suh | H04W 8/265 | 455/418 |
| 2014/0185521 A1 | 7/2014 | Aksu et al. | | |
| 2014/0235284 A1* | 8/2014 | Chen | H04W 4/14 | 455/466 |
| 2014/0254523 A1* | 9/2014 | Chai | H04W 76/02 | 370/329 |
| 2014/0313889 A1* | 10/2014 | Jeong | H04W 76/19 | 370/230 |
| 2014/0335791 A1* | 11/2014 | Kim | H04W 4/023 | 455/41.2 |
| 2014/0376511 A1* | 12/2014 | Kalapatapu | H04L 65/1016 | 370/331 |
| 2015/0142623 A1* | 5/2015 | Ferguson | G06F 21/88 | 705/30 |
| 2015/0215823 A1* | 7/2015 | Qu | H04W 36/0022 | 370/331 |
| 2015/0264553 A1* | 9/2015 | Janosi | H04W 8/12 | 455/433 |
| 2015/0326619 A1* | 11/2015 | Lau | H04L 65/1073 | 370/328 |
| 2015/0327207 A1* | 11/2015 | Bharadwaj | H04W 8/04 | 455/435.2 |
| 2016/0021146 A1 | 1/2016 | Mufti et al. | | |
| 2016/0157056 A1* | 6/2016 | Kim | H04W 4/023 | 455/414.1 |

(56) References Cited

OTHER PUBLICATIONS

Torres et al.; Motorola, Inc. "IMS Registration per Access Network," IP.COM Journal, IP.COM Inc., Dec. 6, 2017, 7 pages.
3GPP TS 23.228 V12.5.0, "3GPP; TSGSSA; IP Multimedia Subsystem (IMS); Stage 2 (Release 12)," Jun. 24, 2014, 310 pages.
International Searching Authority, International Search Report and Written Opinion, PCT Application PCT/US2015/040818, dated Oct. 30, 2015, 12 pages.

* cited by examiner

| Entry No. | Roaming Partner PLMN | RAT Type | Whitelisted IMS Feature Tags |
|---|---|---|---|
| 1 | 310 : 260 | E-UTRAN | "+g.3gpp.icsi-ref="urn%3Aurn-7%3A3gpp-service.ims.icsi.mmtel" |
| 2 | 415 : 275 | GERAN | "+g.3gpp.icsi-ref="urn%3Aurn-7%3A3gpp-service.ims.icsi.mmtel;+g.3gpp.smsip;+g.3gpp.icsi-ref="urn%3Aurn-7%3A3gpp-service.ims.icsi.oma.cpm.msg." |
| ... | | | |
| n | | | |

*FIG. 2C*

ENHANCED IMS SERVICES RESTRICTION AND SELECTION CONTROL FOR MOBILE DEVICES ROAMING IN FOREIGN NETWORKS

CROSS-REFERENCE TO RELATED APPLICATION(S)

This application is a continuation of U.S. patent application Ser. No. 14/335,836 filed Jul. 18, 2014, the entirety of which is hereby incorporated by reference.

BACKGROUND

The Internet Protocol Multimedia Subsystem ("IMS") is an architectural framework for delivering Internet Protocol ("IP") multimedia to mobile users, such as users of smart phones or tablet computers. An IMS core network ("IMS core") permits wireless and wireline devices to access multimedia, messaging, and voice applications and services. IMS standards and specifications have been promulgated by the 3rd Generation Partnership Project ("3GPP"™). To allow the IMS core to be integrated with Internet resources, the 3GPP specifications use Internet Engineering Task Force protocols within the IMS core, such as Session Initiation Protocol ("SIP") and Diameter. SIP is a signaling protocol used for creating, modifying and terminating two-party or multiparty sessions consisting of one or several media streams. A mobile device registers its IP address with a SIP registrar server within an IMS core by generating and sending a SIP request message with a "REGISTER" method token. Once registered, a mobile device may subsequently establish multimedia sessions via the IMS core.

An IMS client (or IMS stack) software component on a mobile device allows one or more applications on the mobile device to register for various application services that are available on the IMS network, such as Voice over LTE (VoLTE), Rich Communication Services (RCS), Short Message Service over Internet Protocol (SMS over IP), and Presence. If the registration is successful, the mobile device application may then take advantage of the functionality offered by the application service to which it is registered. If the registration is unsuccessful, however, then the application will be unable to take advantage of the offered functionality.

In cases where a mobile device requests multiple IMS services while roaming in a foreign network (i.e., a visited Public Land Mobile Network (PLMN)), the operator of a home network that is associated with the mobile device (i.e., a Home PLMN) may find it desirable to allow the mobile device to register for certain IMS services while restricting the mobile device from registering for certain for other IMS services. A mobile network operator may desire such functionality for a variety of reasons. For example, an operator may restrict certain IMS services in order to avoid technical conflicts, optimize network traffic, or offer premium services to certain subscribers. In the case of technical conflicts, the operator may desire to avoid an incompatibility between two or more IMS services. For example, the operator may determine that enabling both LTE roaming and Voice over LTE (VoLTE) on the same mobile device may cause problems in the telecommunications network or at the mobile device. As a result, the operator may wish to establish a service policy that allows a mobile device to register for LTE roaming or VoLTE, but not both. The operator may wish to establish this policy and other policies that would restrict access to one or more whitelisted IMS services based on criteria including the visited network from which the mobile device is roaming and the Radio Access Technology (RAT) type associated with the home network. Moreover, the operator may wish to administer the service policy within the IMS network to avoid the need to maintain a copy of the service policy in multiple application servers and to reduce the amount of signaling that must occur in the network to accomplish registration of the whitelisted services.

BRIEF DESCRIPTION OF THE DRAWINGS

FIG. 2C is an illustration of a policy table consistent with the embodiments disclosed herein.

DETAILED DESCRIPTION

Representative Environment

Figure 1A:
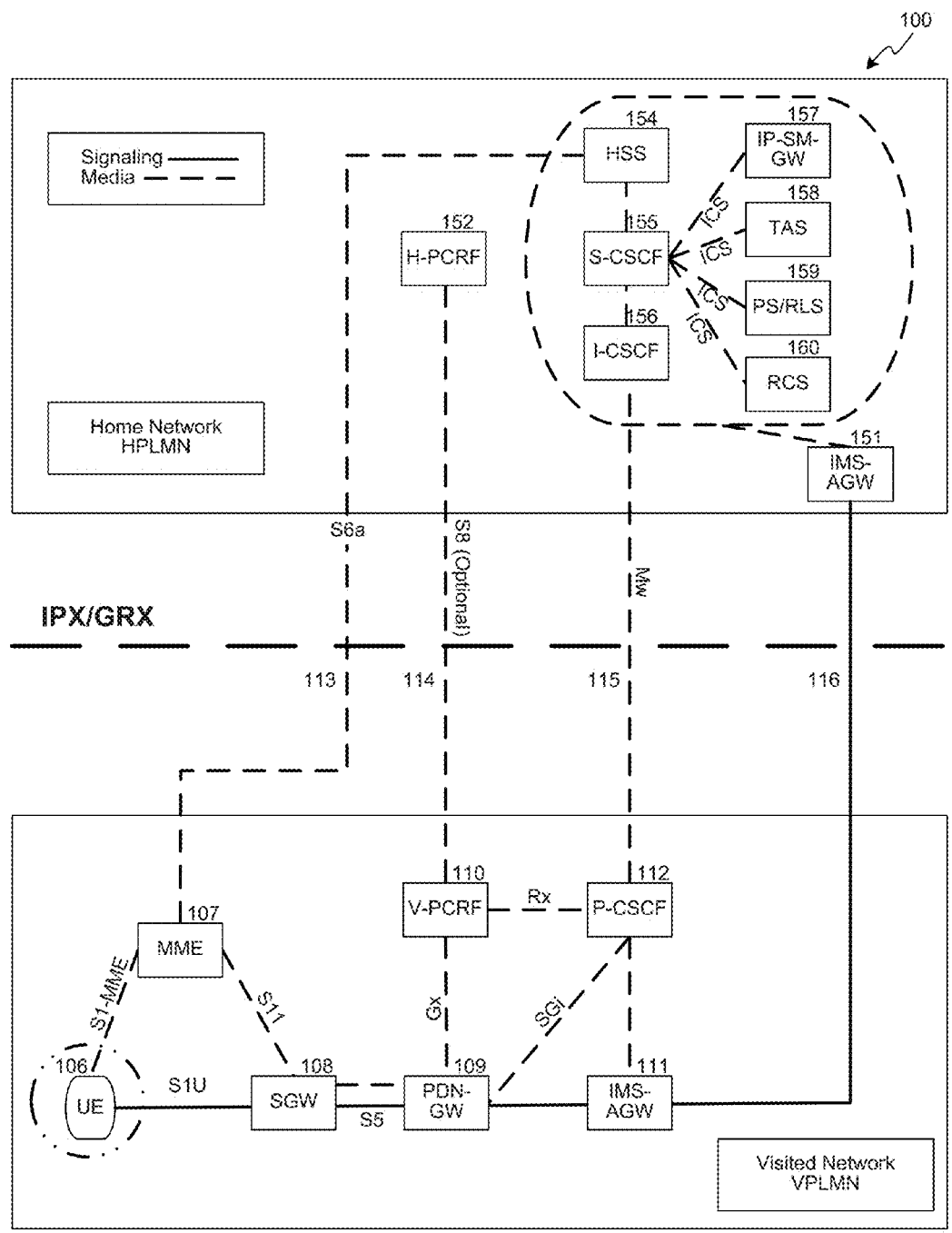
FIG. 1A is a diagram of a representative Internet Protocol Multimedia Subsystem (IMS) environment 100 in which a user roaming in a visited network may request IMS services through a home network.

FIG. 1A is a diagram of a representative Internet Protocol Multimedia Subsystem (IMS) environment 100 in which a user roaming in a visited network may request IMS services through a home network. The environment 100 includes both visited network 105 and home network 150. Visited Public Land Mobile Network (VPLMN) 105 contains user equipment (UE) 106, which may represent a mobile communications device (e.g., smartphone or tablet) of a user who is roaming in visited network 105. Visited network 105 also typically includes a variety of network components that allow UE 106 to request and receive IMS services, including Mobility Management Entity (MME) 107, Service Gateway (SGW) 108, Packet Data Network Gateway (PDN-GW) 109, Visited Policy and Charging Rules Function (V-PCRF) 110, IMS Access Gateway (IMS-AGW) 111, and Proxy Call Session Control Function (P-CSCF) 112. Visited network 105 may contain additional components (not shown) or may contain a fewer number of components than are depicted in FIG. 1A.

Home Public Land Mobile Network (HPLMN) 150 contains a variety of network components, including IMS-AGW 151 and Home Policy and Charging Rules Function H-PCRF 252. Home network 150 also contains an IMS core 153, which comprises Home Subscriber Server HSS 154, Serving Call Session Control Function (S-CSCF) 155, Interrogating Call Session Control Function (I-CSCF) 156, IP-Short-Message Gateway (IP-SM-GW) 157, Telephony Application Server (TAS) 158, Presence Server/Resource List Server (PS/RLS) 159, and Rich Communication Server (RCS) 160. Home network 150 may contain additional components (not shown) or may contain a fewer number of components than are depicted in FIG. 1A. Additional details about IMS networks such as home network 150 may be found in commonly assigned U.S. Pat. No. 8,611,890 (entitled "SYSTEM AND METHOD FOR SUBSCRIBING FOR INTERNET PROTOCOL MULTIMEDIA SUBSYSTEMS (IMS) SERVICES REGISTRATION STATUS," filed Feb. 23, 2013), which is herein incorporated by reference in its entirety. In the environment 100, visited network 105 is coupled to home network 150 via media connections 113-115 and via signaling connection 116. A person of ordinary skill in the art will appreciate that home network 105 and visited network 150 may be coupled by more connections or fewer connections than shown in FIG. 1A.

The IMS allows service providers to implement a compelling set of mobile services for mobile devices. IMS registration for different IMS services may be based on SIP Event Package for Registration Information defined in Request for Comments (RFC) 3680 and procedures defined in 3GPP Test Specification (TS) 24.229. Users may employ mobile devices 202 to communicate with other users and devices. In addition, users may employ mobile devices 106 to receive, provide, or otherwise interact with multiple IMS services. For example, location-based services are services that use the actual or approximate location of a mobile device to provide, enhance, or supplement a service to the mobile device. Location-based services include, but are not limited to, services such as emergency services (e.g., E911), asset tracking or recovery services (e.g., the tracking of a stolen car), location-based alerts or advertising services (e.g., targeted advertisements that depend on the location of a mobile device user), social networking services (e.g., services that report the relative location of friends or family), and/or the like. In addition, users may employ mobile devices 106 to receive, provide, or otherwise interact with additional IMS services, including image sharing services, gaming services, multimedia telephony services, instant messaging and presence services, video conferencing and sharing services, Push-to-talk over Cellular (PoC) services, 3GPP combinational services (CSI), and other telecommunications and Internet converged services. Once a mobile device 106 has successfully registered with the IMS core 153, the device may establish multimedia sessions managed by the IMS core in order to access applications and services that facilitate communication, location-based services and/or other services.

Mobile devices 106 may include virtually any devices for communicating over a wireless network. Such devices include mobile telephones, such as Global System for Mobile Communications ("GSM") telephones, Time Division Multiple Access ("TDMA") telephones, Universal Mobile Telecommunications System ("UMTS") telephones, Evolution-Data Optimized ("EVDO") telephones, Long Term Evolution ("LTE") telephones, Generic Access Network ("GAN") telephones, Unlicensed Mobile Access ("UMA") telephones, and other mobile computers or devices, such as Voice over Internet Protocol ("VoIP") devices, Secure User Plane Location ("SUPL") Enabled Terminals (SETs), Personal Digital Assistants ("PDAs"), radio frequency devices, infrared devices, handheld computers, laptop computers, wearable computers, tablet computers, pagers, integrated devices combining one or more of the preceding devices, and/or the like.

Figure 1B:
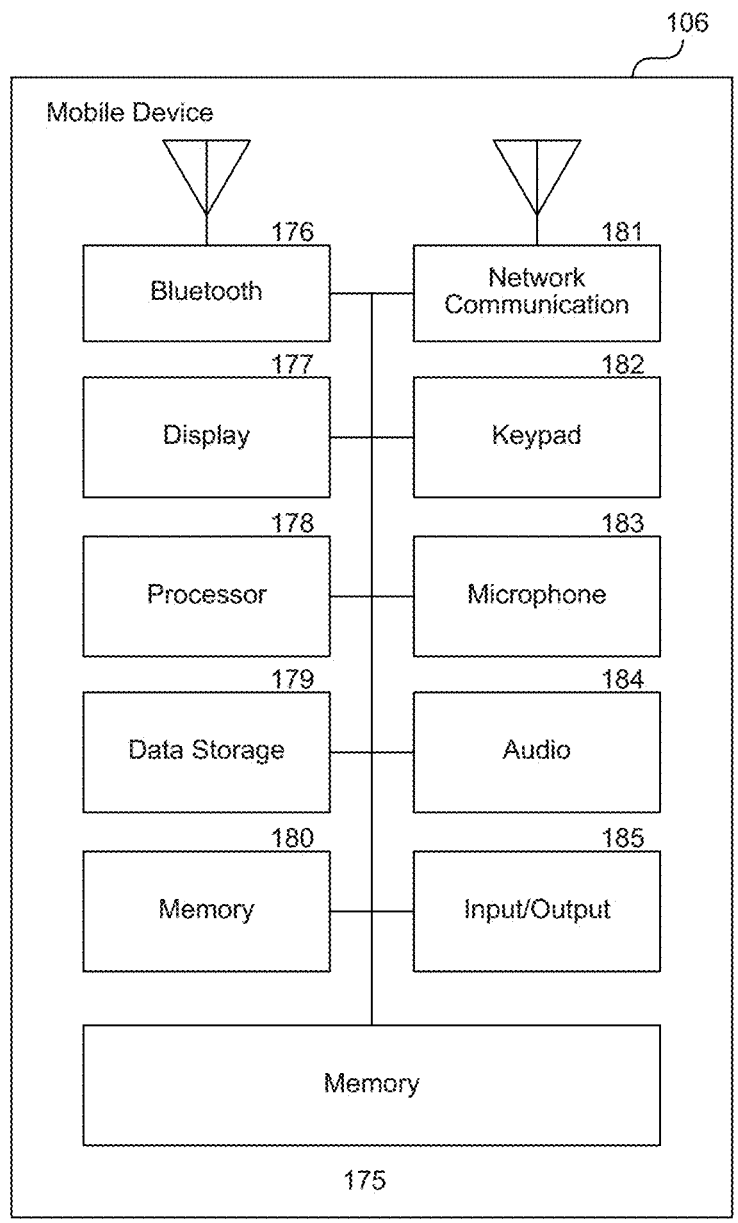
FIG. 1B is a block diagram of a representative mobile device that may request IMS services while roaming in a foreign network.

As shown in FIG. 1B, which is a block diagram of a representative mobile device, each mobile device 106 typically includes a processor 178 for executing processing instructions, a data storage medium component 179 (e.g., hard drive, flash memory, memory card, etc.), volatile memory and/or nonvolatile memory 180, a power supply 175, one or more network interfaces (e.g., Bluetooth Interface 176; and Network Communication Interface 181, which enables the mobile phone to communicate by transmitting and receiving wireless signals using licensed, semi-licensed or unlicensed spectrum over a telecommunications network), an audio interface 184, a display 177, a keypad or keyboard 182, and other input and/or output interfaces 185. The various components of a mobile device may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications. The stored information may include one or more SIP clients capable of generating, transmitting and interpreting syntactically correct SIP messages. SIP clients permit the mobile device to register with and communicate via the ISM core 153.

In order to register with the IMS core 153, a SIP client running on a mobile device 106 generates and sends an initial SIP registration message from visited network 105 to IMS core 153 in home network 150. The initial registration message comprises a REGISTER method token and extended header information, including an IMEI and IMSI associated with the mobile device 153, P-Access-Network Info, P-Visited-Network ID, and Contact Header information that includes an identification of one or more requested IMS services. The P-CSCF 112 receives the initial SIP registration message and forwards the message to the I-CSCF 156. One skilled in the art will appreciate that in some examples, the P-CSCF may also perform some or all of the functionality of the IMC core 153.

The HSS 214 is a master user database that contains subscription-related information such as subscriber profiles. The HSS performs authentication and authorization of a mobile device 202 and provides information about a mobile device's IP address. The HSS may perform standard IMS registration processes as described by 3GPP specifications and standards. The HSS also validates the IMEI/IMSI identifiers in the UAR in order to determine whether to deny registration to a mobile device 202. The HSS may also use a received IMEI to determine the capabilities of a mobile device.

Overview of Registration with IMS Services

Figure 2A:
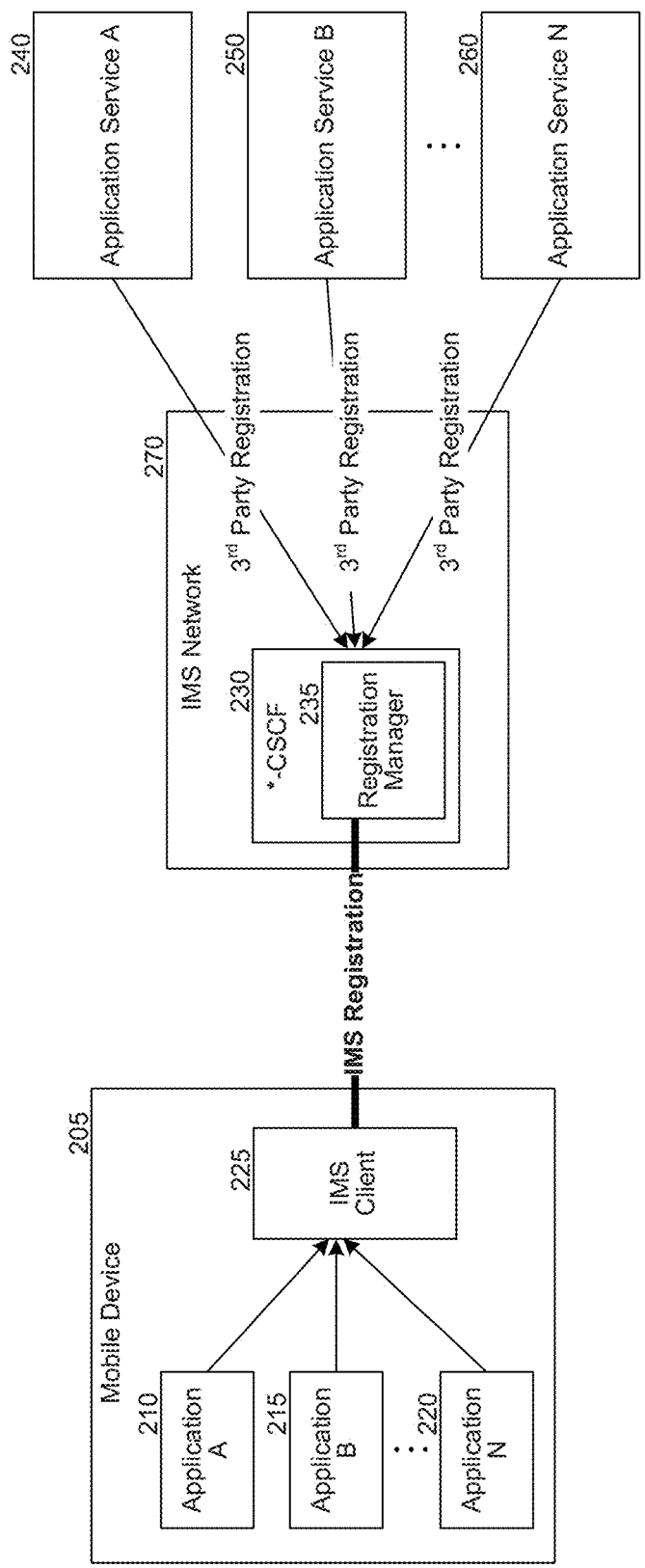
FIG. 2A is a block diagram providing a simplified view of the registration and delivery of IMS application services to mobile devices.

FIG. 2A is a block diagram providing a simplified view of the registration and delivery of IMS application services to mobile devices. Applications running in the mobile device 205 use an IMS client 225 to register for application services in the IMS network. The IMS client (or IMS stack) maintains an IMS registration as long as an application needs to stay connected with a corresponding application service. The IMS proxies (*-CSCFs) 230 in the IMS network maintain the registration initiated by the mobile device and provide the appropriate routing for IMS traffic. When for any reason one of the application servers involved rejects the initial registration request, the IMS service is not available to the mobile device and the application functionality on the mobile device may be substantially or completely impacted by the registration failure.

In FIG. 2A, three applications on the mobile device 205 are depicted as using applications services, namely application A (210), application B (215), and application N (220). Applications on the mobile device communicate with the IMS network through IMS client 225. The IMS client 225 resides within the mobile device and manages communications between mobile device applications and other components in the IMS network. For example, IMS client 225 receives registration requests from the mobile device applications (210, 215, and 220), forwards the received registration requests to IMS network 270, receives registration status notification subscription requests from the mobile device applications, and forwards the received registration status notification subscription requests to the IMS network. In some embodiments, the IMS client 225 additionally receives registration status notifications from the application services 240, 250, and 260 and forwards the received status notifications to the appropriate mobile device applications. Those skilled in the art will appreciate that the IMS client 225 may be implemented in an Android™, Windows™, iOS™, or other operating system environment that is used by mobile devices.

The IMS client 225 connects to a registration manager component 235 within one or more of the CSCF 230 in the IMS network. The registration manager component 235 resides within the IMS network and manages registrations between one or more mobile device applications 210, 215, and 220 and one or more application services 240, 250, and 260. For example, registration manager 235 receives registration requests from the mobile device applications, queries a policy database of whitelisted IMS services, forwards the request for whitelisted services to the appropriate application servers, receives registration status notification subscription requests from the IMS client, and forwards the received registration status notification subscription requests to the appropriate application servers. In some embodiments, registration manager 235 may receive a single request that functions as both a registration request and a registration status notification subscription request.

Figure 2B:
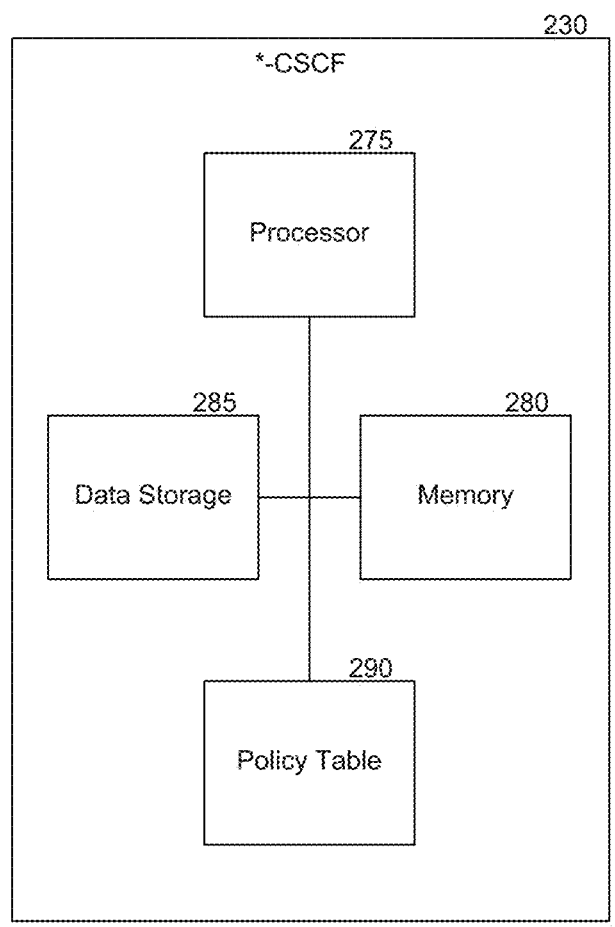
FIG. 2B is a block diagram of a CSCF 230 node within IMS network 270 which implements the functionality of the registration manager component 235.

FIG. 2B is a block diagram of a CSCF 230 node within IMS network 270 which implements the functionality of the registration manager component 235. The CSCF 230 may contain one or more processors 275 for executing processing instructions, a data storage medium component 285 (e.g., hard drive, flash memory, memory card, etc.), a volatile memory and/or nonvolatile memory 280, and a policy table 290. Although depicted separately, it will be appreciated that policy table 290 may be incorporated into data storage 285 or memory 280, or may be incorporated into a component that is external to CSCF 230. Instructions for implementing functions of the registration manager 235 may be stored in the data storage medium and/or memory and executed by the processor. While the registration manager component 235 functionality is depicted as residing within the CSCF 230 in FIG. 2A, it will be appreciated that the registration manager component 235 may be implemented independently from the CSCF 230. That is, the registration manager component 235 may be operated as a stand-alone service within the IMS network 270 or may be incorporated in other network nodes within the IMS network 270.

FIG. 2C is an illustration of a policy table 290. Policy table 290 facilitates an enhancement to the overall registration procedure by defining a service policy at the S-CSCF with additional controls that eliminates the need for an operator to have to develop individual controls across multiple application severs in the network. Policy table 290 includes a column 252 that contains a value that uniquely identifies one or more entries in the table. For any given entry, column 254 contains an indication of the roaming partner PLMN (MCC-MNC) [define] of the visited network. Column 256 contains the RAT type (e.g., E-UTRAN, UTRAN, GERAN) corresponding to a given entry in the policy table. Column 258 contains one or more whitelisted feature tags corresponding to IMS services that are approved for a given combination of roaming partner PLMN and RAT type. For example, policy table 290 contains a first entry corresponding to roaming partner "310: 260," RAT type "E-UTRAN," and IMS feature tag "+g.3gpp.icsi-ref="urn%3Aurn-7%3A3gpp-service.ims.icsi.mmtel."

Policy table 290 contains a second entry corresponding to roaming partner "415: 275," RAT type "GERAN," and IMS feature tags "+g.3gpp.icsi-ref="urn%3Aurn-7%3A3gpp-service.ims.icsi.mmtel" and "+g.3gpp.smsip; +g.3gpp.icsi-ref="urn%3Aurn-7%3A3gpp-service.ims.icsi.oma.cpm.msg."

In the example policy table 290, the first entry sets forth a policy that a user roaming in roaming partner PLMN "310: 260" with RAT type "E-UTRAN" will be granted access to the "±g.3gpp.icsi-ref="urn%3Aurn-7%3A3gpp-service.ims.icsi.mmtel" service, and (unless specified elsewhere in the policy table) the user will be denied access to all other IMS services when roaming from roaming partner PLMN "310: 260" with RAT type "E-UTRAN." Similarly, the second entry sets forth a policy that a user roaming in roaming partner PLMN "415: 275" with RAT type "GERAN" will be granted access to the "+g.3gpp.icsi-ref="urn%3Aurn-7%3A3gpp-service.ims.icsi.mmtel" and "+g.3gpp.smsip; +g.3gpp.icsi-ref="urn%3Aurn-7%3A3gpp-service.ims.icsi.oma.cpm.msg." services. Unless specified elsewhere in the policy table, the user will be denied access to all other IMS services when roaming from roaming partner PLMN "415: 275" with RAT type "GERAN."

Figure 3:
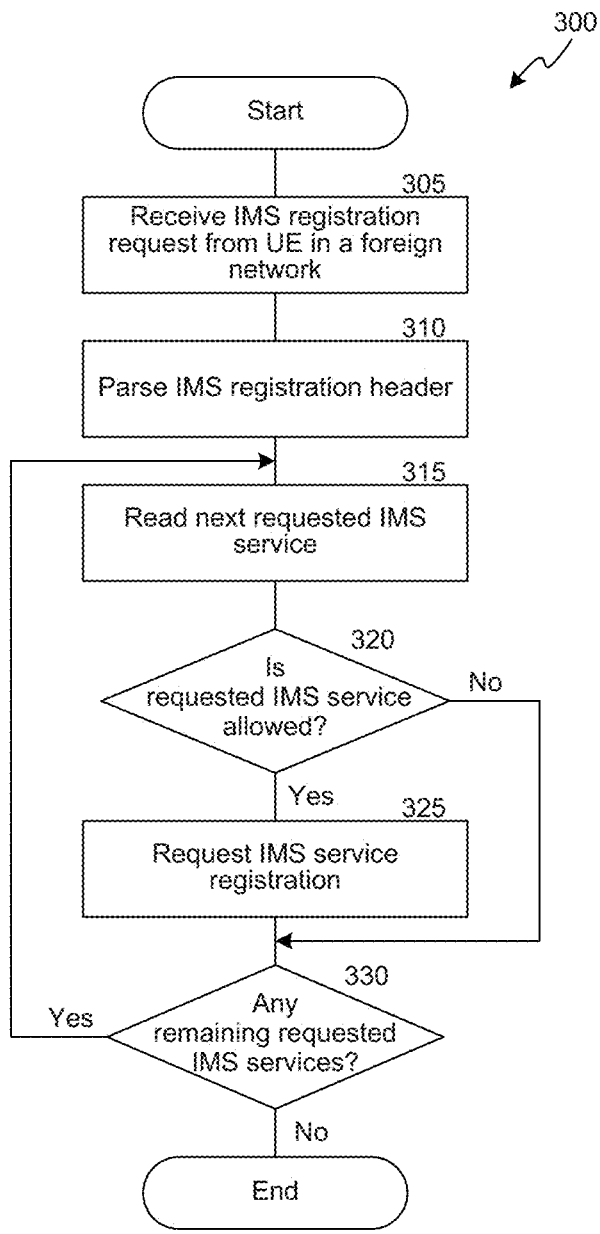
FIG. 3 is a flow diagram illustrating a simplified view of processing a request for IMS services from a UE on a visited network.

Overview of Registration for IMS Services from a User Roaming in a Visited Network FIG. 3 is a flow diagram illustrating a simplified view of processing a request for IMS services from a UE (i.e., mobile device) on a visited network. At step 305, the system receives a REGISTER request from a UE on a visited network. The REGISTER request contains information regarding the registration request, which may include an identification of a visited network, an indication of a RAT type that is associated with a home network, and an indication of one or more requested IMS services. At step 310, the system parses the REGISTER request to read at least the information regarding the identification of a visited network, the RAT type that is associated with a home network, and the indication of one or more requested IMS services. At step 315, the system reads the parsed information to fetch information regarding one or more requested IMS services. At step 320, the system determines whether the requested IMS service is whitelisted. The system may make this determination by querying a policy table to determine whether the associated visited network, RAT type, and requested service are whitelisted in the policy table. If the combination is whitelisted in the policy table, the system proceeds to step 325 to request registration of the IMS service and then proceeds to step 330 to determine whether any requested IMS services remain to be processed. If any IMS services remain to be processed, the system returns to step 315 to fetch the next requested IMS service and process the request, as described above with respect to steps 320 and 325. Returning to step 320, if the combination is not whitelisted in the policy table, the system does not request registration of the IMS service but instead proceeds to step 330 to determine whether any requested IMS services remain to be processed. If any IMS services remain to be processed, the system returns to step 315 to fetch the next requested IMS service and process the request, as described above with respect to steps 320 and 325. Steps 315, 320, and 325 repeat continually until the system determines at step 330 that no IMS services remain to be processed.

Figure 4A:
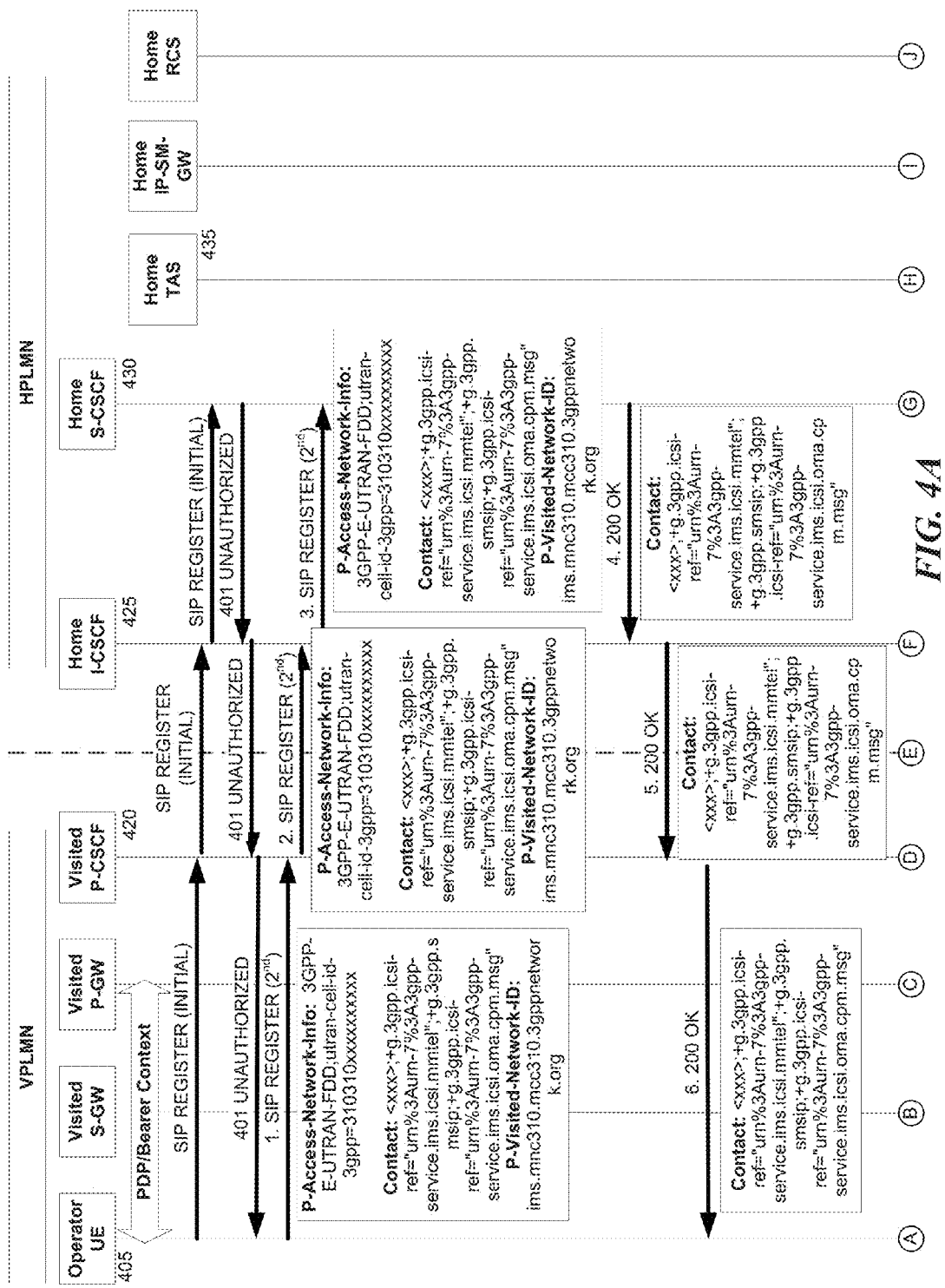
FIGS. 4A-4B are a flow diagram illustrating an embodiment of a registration for IMS services for a UE that is roaming in a visited network.
Figure 4B:
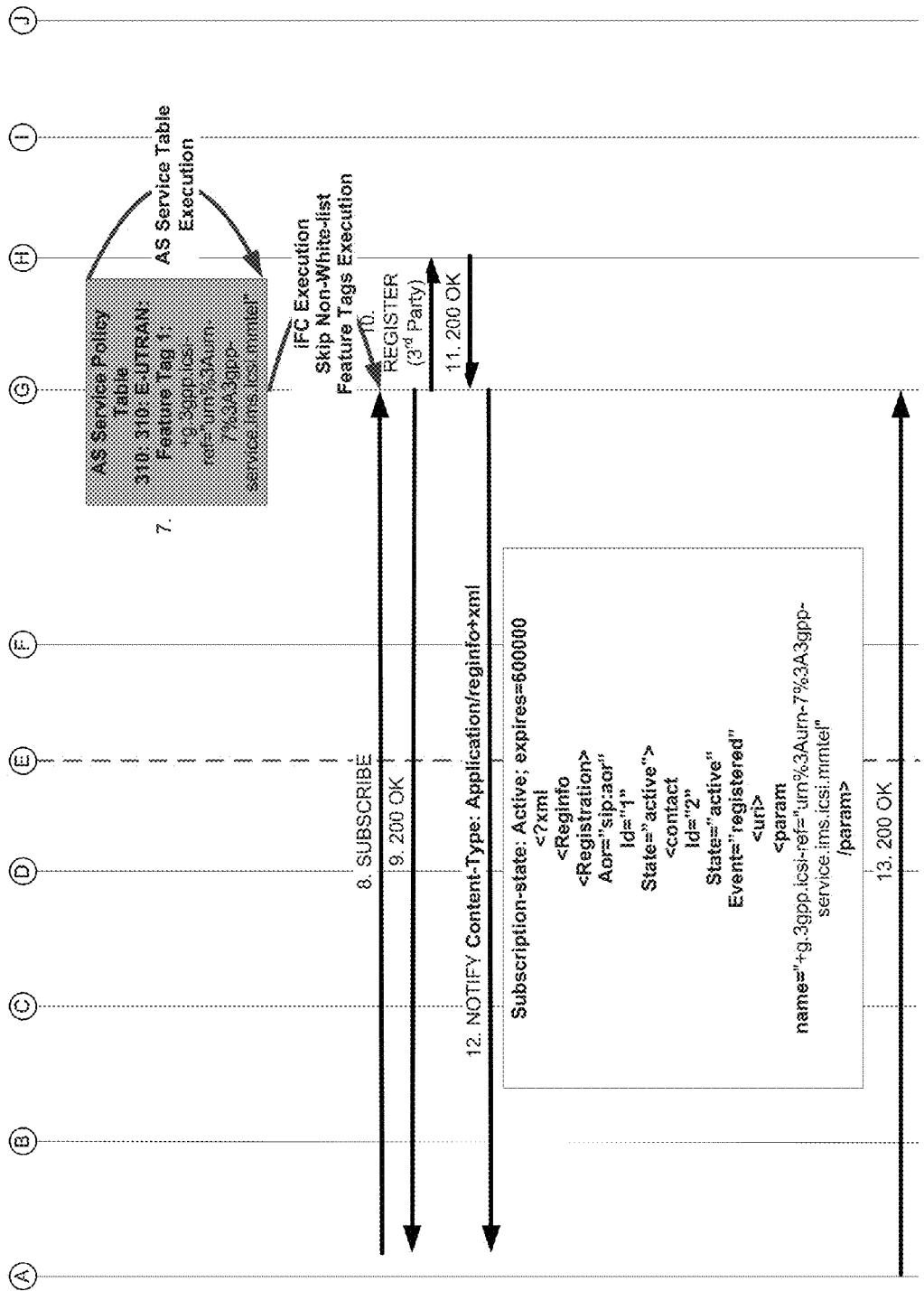

FIGS. 4A-4B are a flow diagram illustrating an embodiment of a registration for IMS services for a UE that is roaming in a visited network. UE 405 sends a SIP REGISTER request towards Visited P-CSCF 420 (step 1). The SIP REGISTER request contains P-Access-Network-Info that identifies the access network and RAT type, P-Visited-Network-ID information that identifies the visited network, and Contact information that identifies the following three IMS services for which the UE requests registration:

1. +g.3gpp.icsi-ref="urn%3Aurn-7%3A3gpp-service.ims.icsi.mmtel
2. +g.3gpp-smsip
3. +g.3gpp.icsi-ref="urn%3Aurn-7%3A3gpp-service.ims.icsi.oma.cpm.msg Visited P-CSCF sends the SIP REGISTER command towards Home I-CSCF 425 (step 2), which sends the SIP REGISTER command towards Home S-CSCF 430 (step 3). Home S-CSCF 425 sends a 200 OK message towards Home I-CSCF 425 (step 4), which sends the 200 OK message towards Visited P-CSCF 420 (step 5). Visited P-CSCF 420 sends the 200 OK message towards UE 405 (step 6). In step 7, Home S-CSCF 430 executes a policy table to determine whether the requested IMS service is authorized for UE 405 based on the associated visited network and RAT type. As depicted at step 7, the policy table indicates that the combination of visited network "310: 310" and RAT type "E-UTRAN" is whitelisted for a single feature tag (i.e., IMS service): "+g.3gpp.icsi-ref=urn%3Aurn-7%3A3gpp-service.ims.icsi.mmtel." Accordingly, although UE 405 requested registration for three IMS services, Home S-CSCF 430 forwards only one registration request that is associated with the whitelisted feature tag. In particular, Home S-CSCF 430 forwards the REGISTER request to Home TAS 435 (at step 10, with a corresponding 200 OK acknowledgment in step 11), which is the application server associated with the whitelisted "+g.3gpp.icsi-ref="urn%3Aurn-7%3A3gpp-service.ims.icsi.mmtel." feature tag. UE 405 sends a SUBSCRIBE request toward Home S-CSCF 430 in order to receive IMS services status notifications (step 8), and Home S-CSCF 430 sends a 200 OK acknowledgement towards UE 405 (step 9). Home S-CSCF 430 sends a NOTIFY message towards UE 405 (step 12) indicating an active registration for whitelisted IMS service "+g.3gpp.icsi-ref="urn%3Aurn-7%3A3gpp-service.ims.icsi.mmtel," and UE 405 sends a 200 OK acknowledgement towards Home S-CSCF 430 (step 13).

Figure 5A:
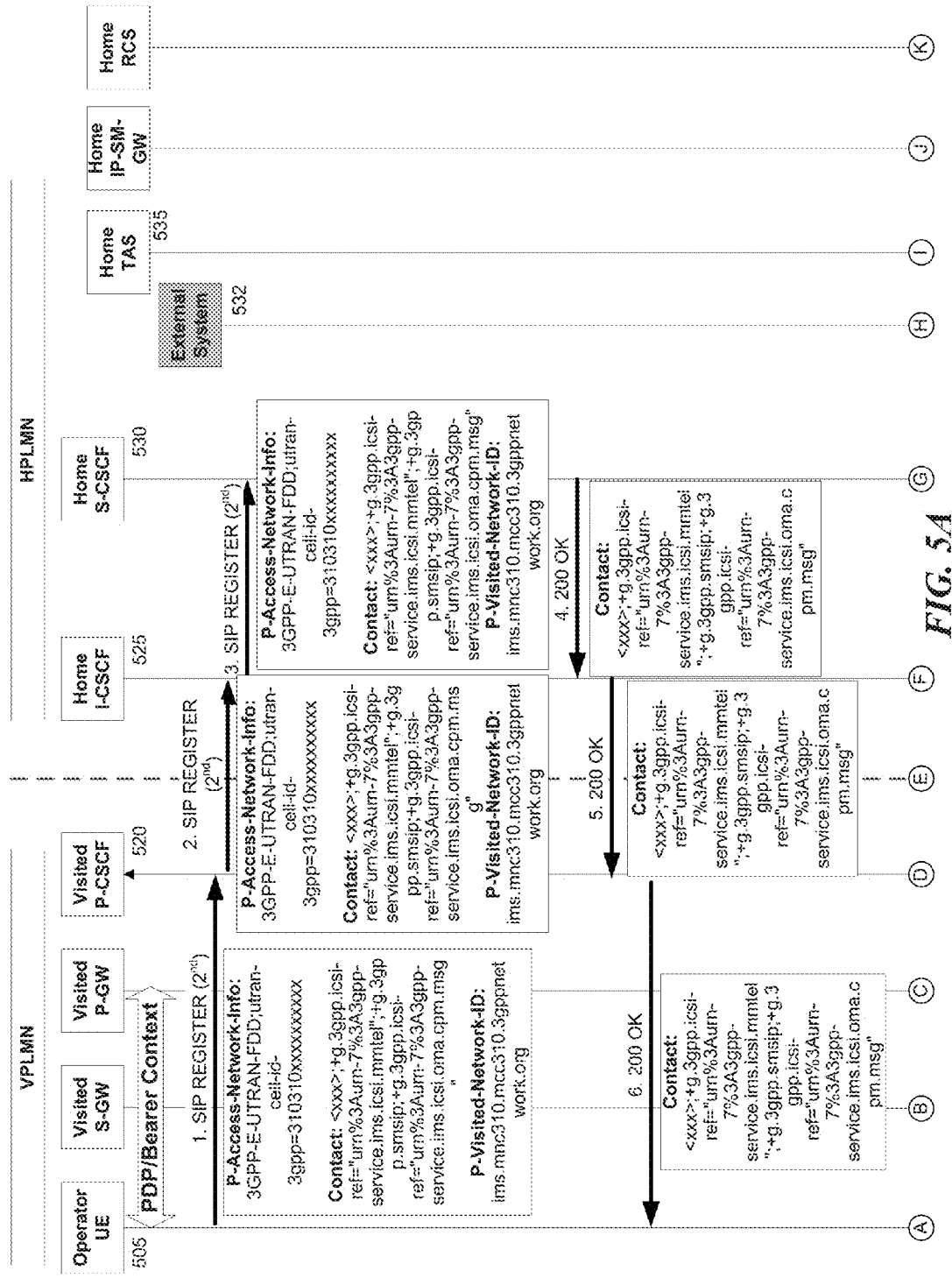
FIGS. 5A-5B are a flow diagram illustrating an embodiment of a registration for IMS services for a UE that is roaming in a visited network.
Figure 5B:
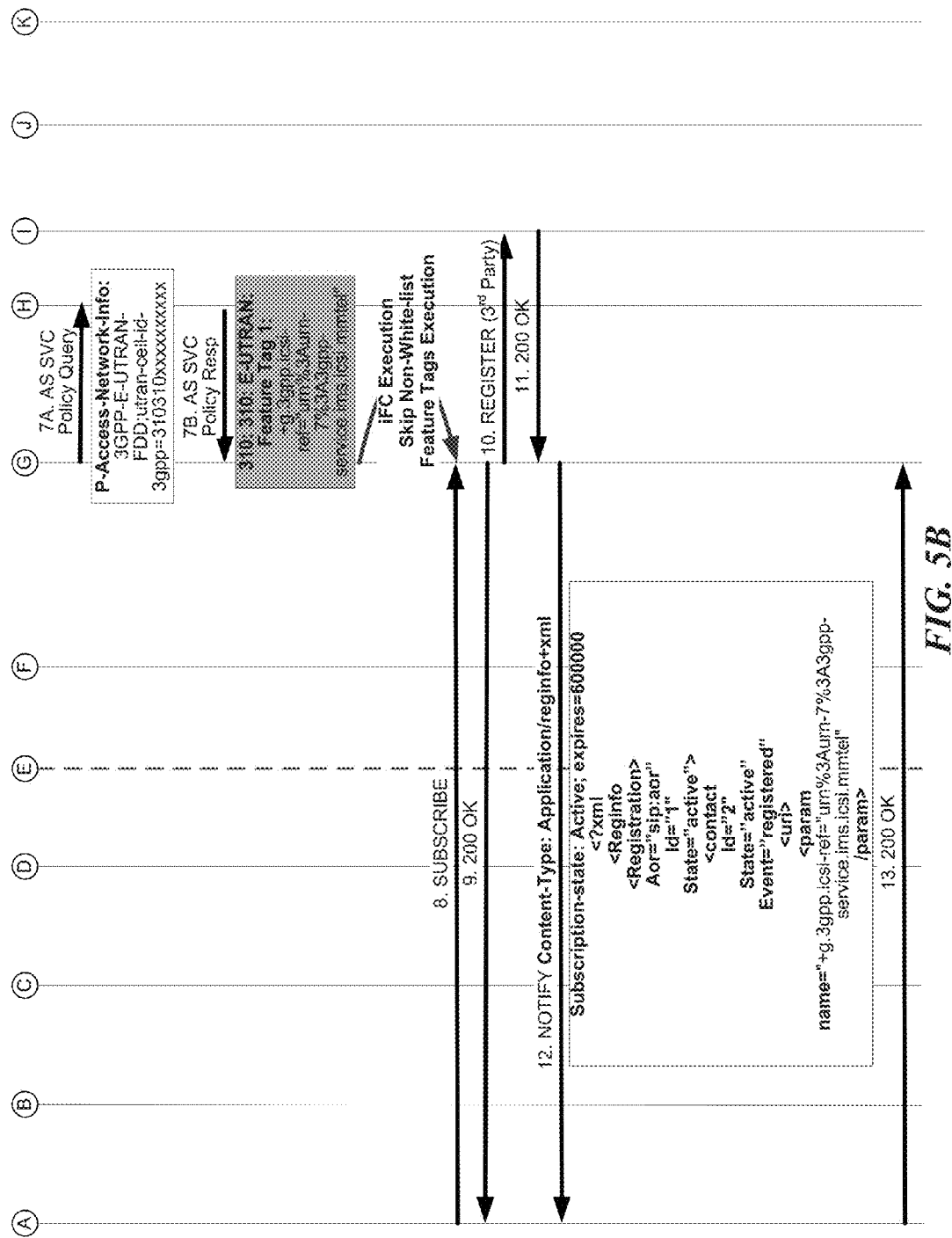

FIGS. 5A-5B are a flow diagram illustrating another embodiment of a registration for IMS services for a UE that is roaming in a visited network. UE 505 sends a SIP REGISTER request towards Visited P-CSCF 520 (step 1). The SIP REGISTER request contains P-Access-Network-Info that identifies the access network and RAT type, P-Visited-Network-ID information that identifies the visited network, and Contact information that identifies the following three IMS services for which the UE requests registration:

4. +g.3gpp.icsi-ref="urn%3Aurn-7%3A3gpp-service.ims.icsi.mmtel
5. +g.3gpp-smsip
6. +g.3gpp.icsi-ref="urn%3Aurn-7%3A3gpp-service.ims.icsi.oma.cpm.msg Visited P-CSCF sends the SIP REGISTER command towards Home I-CSCF 525 (step 2), which sends the SIP REGISTER command towards Home S-CSCF 530 (step 3). Home S-CSCF 525 sends a 200 OK message towards Home I-CSCF 525 (step 4), which sends the 200 OK message towards Visited P-CSCF 520 (step 5). Visited P-CSCF 520 sends the 200 OK message towards UE 505 (step 6). In steps 7A-7B, Home S-CSCF 530 executes a policy table to determine whether the requested IMS service is authorized for UE 505 based on the associated visited network and RAT type. Home S-CSCF 530 queries external system 532 for a list of feature tags associated with visited network "310: 310 and RAT type "E-UTRAN" (step 7A). In response, external system 532 sends an indication towards Home S-CSCF 530 indicating that the combination of visited network "310: 310" and RAT type "E-UTRAN" is whitelisted for a single feature tag (i.e., IMS service): "+g.3gpp.icsi-ref="urn%3Aurn-7%3A3gpp-service.ims.icsi.mmtel" (step 7B). Accordingly, although UE 505 requested registration for three IMS services, Home S-CSCF 530 forwards only one registration request that is associated with the whitelisted feature tag. In particular, Home S-CSCF 530 forwards the REGISTER request to Home TAS 535 (at step 10, with a corresponding 200 OK acknowledgment in step 11), which is the application server associated with the whitelisted "+g.3gpp.icsi-ref="urn%3Aurn-7%3A3gpp-service.ims.icsi.mmtel." feature tag. UE 505 sends a SUBSCRIBE request toward Home S-CSCF 530 in order to receive IMS services status notifications (step 8), and Home S-CSCF 530 sends a 200 OK acknowledgement towards UE 405 (step 9). Home S-CSCF 530 sends a NOTIFY message towards UE 505 (step 12) indicating an active registration for whitelisted IMS service "1-g.3gpp.icsi-ref="urn%3Aurn-7%3A3gpp-service.ims.icsi.mmtel," and UE 505 sends a 200 OK acknowledgement towards Home S-CSCF 530 (step 13).

The above Detailed Description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps, or employ systems having steps, in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

We claim:

1. A computer-implemented method to register a mobile device for Internet Protocol Multimedia Subsystem (IMS) services while the mobile device is roaming in a visited telecommunications network, the method comprising:

receiving a request for one or more IMS services while the mobile device is located in the visited telecommunications network;

querying a table to determine whether the one or more requested IMS services are allowed, wherein querying the table comprises transmitting a query to an external system and receiving a response from the external system, wherein the query includes a network identifier corresponding to the visited telecommunications network and an access identifier corresponding to a radio access technology associated with the mobile device, and wherein the response includes a list of one or more acceptable IMS services for the visited telecommunications network and the radio access type; and registering the mobile device with at least one of the IMS services based on the querying.

2. The computer-implemented method of claim 1, wherein fewer than all of the requested IMS services are determined to be acceptable.

3. The computer-implemented method of claim 1, wherein the external system being located outside of the IMS network.

4. The computer-implemented method of claim 1, wherein the table is located within the IMS network.

5. The computer-implemented method of claim 1, wherein the table is located outside of the IMS network.

6. The computer-implemented method of claim 1, wherein the table is located within the IMS network.

7. The computer-implemented method of claim 1, wherein the radio access technology associated with the mobile device is Universal Terrestrial Radio Access Network (UTRAN), Extended Universal Terrestrial Radio Access Network (E-UTRAN), or GSM EDGE Radio Access Network (GERAN).

8. The computer-implemented method of claim 1, wherein the requested IMS service is Voice over LTE (VoLTE).

9. The computer-implemented method of claim 1, wherein the requested IMS service is SMS over IP.

10. The computer-implemented method of claim 1, wherein the requested IMS service is Rich Communication Suite (RCS) or Presence.

11. A non-transitory computer-readable medium storing instructions that, when executed by a processor in an Internet Protocol Multimedia Subsystem (IMS) network, cause the IMS network to execute operations to register a mobile device for IMS services while the mobile device is roaming in a visited telecommunications network, the operations comprising:

receiving a request for one or more IMS services while the mobile device is located in the visited telecommunications network;

querying a table to determine whether the one or more requested IMS services are allowed, wherein querying the table comprises transmitting a query to an external system and receiving a response from the external system, wherein the query includes a network identifier corresponding to the visited telecommunications network and an access identifier corresponding to a radio access technology associated with the mobile device, and wherein the response includes a list of one or more acceptable IMS services for the visited telecommunications network and the radio access type; and registering the mobile device with at least one of the IMS services based on the querying.

12. The non-transitory computer-implemented method of claim 1, wherein fewer than all of the requested IMS services are determined to be acceptable.

13. The non-transitory computer-readable medium of claim 11, wherein the external system being located outside of the IMS network.

14. The non-transitory computer-readable medium of claim 11, wherein the table is located within the IMS network.

15. The non-transitory computer-readable medium of claim 11, wherein the table is located outside of the IMS network.

16. The non-transitory computer-readable medium of claim 11, wherein the table is located within the IMS network.

17. The non-transitory computer-readable medium of claim 11, wherein the radio access technology associated with the mobile device is Universal Terrestrial Radio Access Network (UTRAN), Extended Universal Terrestrial Radio Access Network (E-UTRAN), or GSM EDGE Radio Access Network (GERAN).

18. The non-transitory computer-readable medium of claim 11, wherein the requested IMS service is Voice over LTE (VoLTE), SMS over IP or Rich Communication Suite (RCS) or Presence.

19. A system for use in an Internet Protocol Multimedia Subsystem (IMS) network that cause the IMS network to execute operations to register a mobile device for IMS services while the mobile device is roaming in a visited telecommunications network, the system comprising:

at least one hardware processor;

at least one memory coupled to the at least one hardware processor and storing instructions, which when executed by the at least one hardware processor, performs operations, the operations including— receiving a request for one or more IMS services while the mobile device is located in the visited telecommunications network;

querying a table to determine whether the one or more requested IMS services are allowed, wherein querying the table comprises transmitting a query to an external system and receiving a response from the external system, wherein the query includes a network identifier corresponding to the visited telecommunications network and an access identifier corresponding to a radio access technology associated with the mobile device, and wherein the response includes a list of one or more acceptable IMS services for the visited telecommunications network and the radio access type; and registering the mobile device with at least one of the IMS services based on the querying.

20. The system of claim 19, wherein the requested IMS service is Voice over LTE (VoLTE), SMS over IP or Rich Communication Suite (RCS) or Presence.

* * * * *